United States Patent
Craun et al.

(10) Patent No.: US 9,133,292 B2
(45) Date of Patent: Sep. 15, 2015

(54) HYDROXYL FUNCTIONAL OIL POLYOL ACRYLIC GRAFT COPOLYMERS

(75) Inventors: Gary P. Craun, Berea, OH (US); Guy J. Stella, Cleveland Heights, OH (US); Kenneth J. Gardner, Independence, OH (US); David J. Telford, Copley, OH (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 13/147,828

(22) PCT Filed: Mar. 2, 2010

(86) PCT No.: PCT/EP2010/052576
§ 371 (c)(1),
(2), (4) Date: Aug. 4, 2011

(87) PCT Pub. No.: WO2010/100121
PCT Pub. Date: Sep. 10, 2010

(65) Prior Publication Data
US 2011/0294946 A1   Dec. 1, 2011

Related U.S. Application Data

(60) Provisional application No. 61/157,732, filed on Mar. 5, 2009.

(30) Foreign Application Priority Data

May 14, 2009 (EP) ..................................... 09160286

(51) Int. Cl.
| | |
|---|---|
| C08G 65/14 | (2006.01) |
| C08L 71/08 | (2006.01) |
| B32B 27/38 | (2006.01) |
| C08F 289/00 | (2006.01) |
| B32B 27/28 | (2006.01) |
| C09D 151/00 | (2006.01) |
| C09D 191/00 | (2006.01) |
| C08L 61/06 | (2006.01) |
| C08L 61/24 | (2006.01) |
| C08L 61/26 | (2006.01) |
| C08L 61/28 | (2006.01) |
| C08L 67/00 | (2006.01) |
| C08L 69/00 | (2006.01) |
| C08L 71/02 | (2006.01) |
| C08L 75/00 | (2006.01) |

(52) U.S. Cl.
CPC ............. *C08F 289/00* (2013.01); *B32B 27/285* (2013.01); *C08G 65/14* (2013.01); *C08L 71/08* (2013.01); *C09D 151/00* (2013.01); *C09D 191/00* (2013.01); *C08L 61/06* (2013.01); *C08L 61/24* (2013.01); *C08L 61/26* (2013.01); *C08L 61/28* (2013.01); *C08L 67/00* (2013.01); *C08L 69/00* (2013.01); *C08L 71/02* (2013.01); *C08L 75/00* (2013.01)

(58) Field of Classification Search
None
See application file for complete search history.

(56) References Cited

U.S. PATENT DOCUMENTS

| | | | |
|---|---|---|---|
| 2,967,162 | A | 1/1961 | Vasta |
| 3,248,356 | A | 4/1966 | Snyder |
| 3,424,766 | A * | 1/1969 | Masters ..................... 549/539 |
| 3,647,520 | A | 3/1972 | Gor et al. |
| 3,699,061 | A | 10/1972 | Cunningham |
| 3,827,993 | A | 8/1974 | Cunningham et al. |
| 3,912,670 | A | 10/1975 | Huemmer et al. |
| 4,012,559 | A | 3/1977 | Fujioka et al. |
| 4,025,548 | A | 5/1977 | Huemmer et al. |
| 4,199,622 | A | 4/1980 | Kokumai et al. |
| 4,212,781 | A | 7/1980 | Evans et al. |
| 4,264,483 | A | 4/1981 | Laufer et al. |
| 4,333,865 | A | 6/1982 | Zuckert |
| 4,377,457 | A | 3/1983 | Boeckeler et al. |
| 4,425,450 | A | 1/1984 | Horvath |
| 4,522,961 | A | 6/1985 | Martino et al. |
| 4,543,430 | A | 9/1985 | Falgoux et al. |
| 4,657,781 | A | 4/1987 | Nicco et al. |

(Continued)

FOREIGN PATENT DOCUMENTS

| | | |
|---|---|---|
| CN | 1693396 A | 11/2005 |
| CN | 101195577 A | 6/2008 |

(Continued)

OTHER PUBLICATIONS

Derwent accession No. 2009-A35572 for Chinese Patent No. 101195577 A, Jun. 11, 2008, Dou, Li and Wang, two pages.*

(Continued)

*Primary Examiner* — Robert Sellers

(57) ABSTRACT

Hydroxyl functional oil polyol acrylic graft copolymers are disclosed which can be used to produce coating compositions and coated surfaces. In some embodiments, the coating compositions are used to coat substrates such as packaging materials and the like for the storage of food and beverages. The hydroxyl functional oil polyol acrylic graft copolymers can be prepared by heating an epoxidized vegetable oil and a hydroxyl functional material in the presence of an acid catalyst to form a hydroxyl functional oil polyol, and reacting the hydroxyl functional oil polyol with a mixture of an ethylenically unsaturated monomer component in the presence of an initiator to form the hydroxyl functional oil polyol acrylic graft copolymer. Coating compositions can be prepared by crosslinking the hydroxyl functional oil polyol acrylic graft copolymers with a crosslinker.

13 Claims, 1 Drawing Sheet

(56) References Cited

U.S. PATENT DOCUMENTS

| | | |
|---|---|---|
| 4,707,535 A | 11/1987 | Koleske |
| 4,829,124 A | 5/1989 | Clark |
| 4,886,893 A | 12/1989 | Meffert et al. |
| 4,959,271 A * | 9/1990 | Sun .................... 428/476.3 |
| 5,043,380 A | 8/1991 | Cole |
| 5,318,808 A | 6/1994 | Crivello et al. |
| 5,380,886 A | 1/1995 | Daute et al. |
| 5,686,140 A | 11/1997 | Stoffel |
| 5,714,539 A | 2/1998 | Perez et al. |
| 5,728,796 A | 3/1998 | Liao et al. |
| 5,733,970 A | 3/1998 | Craun |
| 6,001,898 A | 12/1999 | Lutz |
| 6,197,878 B1 | 3/2001 | Murray et al. |
| 6,399,672 B1 | 6/2002 | Ceska et al. |
| 6,433,125 B1 | 8/2002 | Gruetzmacher et al. |
| 6,573,354 B1 | 6/2003 | Petrovic et al. |
| 6,686,435 B1 | 2/2004 | Petrovic et al. |
| 6,924,377 B2 | 8/2005 | Blazecka et al. |
| 7,192,992 B2 | 3/2007 | Ramsey |
| 7,645,521 B2 | 1/2010 | Wevers et al. |
| 7,745,508 B2 | 6/2010 | Kiefer-Liptak et al. |
| 7,868,085 B2 | 1/2011 | Lamers et al. |
| 2002/0147270 A1 | 10/2002 | Kuo et al. |
| 2002/0151626 A1 | 10/2002 | Isaka |
| 2003/0004231 A1 | 1/2003 | Ehmann et al. |
| 2003/0064185 A1 | 4/2003 | Mazza et al. |
| 2003/0148257 A1 | 8/2003 | Berkowitz et al. |
| 2003/0187128 A1 | 10/2003 | Shiba et al. |
| 2003/0236415 A1 | 12/2003 | Blazecka et al. |
| 2004/0097611 A1 | 5/2004 | Nienhaus et al. |
| 2004/0180933 A1 | 9/2004 | Brown et al. |
| 2005/0209361 A1 | 9/2005 | Detrembleur et al. |
| 2006/0116501 A1 | 6/2006 | Mager et al. |
| 2007/0017440 A1 | 1/2007 | Tang et al. |
| 2007/0036903 A1 | 2/2007 | Mayr et al. |
| 2008/0108728 A1 * | 5/2008 | White et al. .............. 522/174 |
| 2008/0220267 A1 | 9/2008 | Howell et al. |
| 2008/0299343 A1 | 12/2008 | Vogt et al. |
| 2008/0302694 A1 * | 12/2008 | Gardner et al. ........... 206/524.3 |
| 2010/0055467 A1 | 3/2010 | Kulfan et al. |
| 2010/0093913 A1 | 4/2010 | Jones et al. |
| 2010/0190951 A1 * | 7/2010 | Suppes et al. ............. 528/85 |
| 2010/0217022 A1 | 8/2010 | Abraham et al. |
| 2010/0292492 A1 * | 11/2010 | Geng et al. ............... 549/539 |
| 2011/0195263 A1 | 8/2011 | Malotky et al. |
| 2011/0207850 A1 | 8/2011 | Kan et al. |
| 2011/0294946 A1 | 12/2011 | Craun et al. |
| 2012/0022186 A1 * | 1/2012 | Craun et al. .............. 523/455 |
| 2014/0309338 A1 | 10/2014 | Li et al. |
| 2014/0364537 A1 | 12/2014 | Li et al. |

FOREIGN PATENT DOCUMENTS

| | | | |
|---|---|---|---|
| CN | 101225141 A * | 7/2008 | |
| CN | 101243036 A | 8/2008 | |
| DE | 102 25 367 C1 | 9/2003 | |
| EP | 0 329 027 A2 | 8/1989 | |
| EP | 0 493 916 A2 | 7/1992 | |
| GB | 1100569 | 1/1968 | |
| GB | 2 052 526 A | 1/1981 | |
| GB | 1 597 610 | 9/1981 | |
| GB | 2 100 271 A | 12/1982 | |
| GB | 2 197 654 A | 5/1988 | |
| GB | 2 218 704 A | 11/1989 | |
| GB | 2 305 919 A | 4/1997 | |
| GB | 2 428 678 A | 2/2007 | |
| GB | 2428678 A * | 2/2007 | |
| GB | 2428678 B | 1/2010 | |
| JP | 55-120613 A | 9/1980 | |
| JP | 58-21411 A | 2/1983 | |
| JP | 58-185604 A | 10/1983 | |
| JP | 60-47074 A | 3/1985 | |
| JP | 60 -156707 A | 8/1985 | |
| JP | 60-156708 A | 8/1985 | |
| JP | 63-112670 A | 5/1988 | |
| JP | 2-92916 A | 4/1990 | |
| JP | 2-232219 A | 9/1990 | |
| JP | 3-91579 A | 4/1991 | |
| JP | 9-183940 A | 7/1997 | |
| JP | 11-140160 A | 5/1999 | |
| JP | 2004-250505 A | 9/2004 | |
| JP | 2008-156595 A | 7/2008 | |
| RU | 2 391 368 C1 | 6/2010 | |
| WO | WO 94/12554 A1 | 6/1994 | |
| WO | 96/20234 A1 | 7/1996 | |
| WO | WO 00/11068 A1 | 3/2000 | |
| WO | WO 01/12711 A1 | 2/2001 | |
| WO | WO 01/23471 A1 | 4/2001 | |
| WO | 03/089479 A2 | 10/2003 | |
| WO | WO 2004/096882 A1 | 11/2004 | |
| WO | 2005/033167 A2 | 4/2005 | |
| WO | WO 2006/012344 A1 | 2/2006 | |
| WO | WO 2006/045017 A1 | 4/2006 | |
| WO | WO 2006/096321 A2 | 9/2006 | |
| WO | WO 2006/138637 A1 | 12/2006 | |
| WO | WO 2007/127379 A1 | 11/2007 | |
| WO | 2008/134217 A1 | 11/2008 | |
| WO | WO 2008/151286 A1 | 12/2008 | |
| WO | WO 2009/007296 A1 | 1/2009 | |
| WO | WO 2009/137014 A1 | 11/2009 | |
| WO | WO 2010/019180 A1 | 2/2010 | |
| WO | WO 2010/062844 A1 | 6/2010 | |
| WO | WO 2010/097353 A1 | 9/2010 | |
| WO | WO 2010/100121 A1 | 9/2010 | |
| WO | WO 2010/100122 A1 | 9/2010 | |
| WO | WO 2010/114648 A1 | 10/2010 | |
| WO | WO 2011/009024 A1 | 1/2011 | |
| WO | WO 2011/011705 A2 | 1/2011 | |
| WO | WO 2011/011707 A2 | 1/2011 | |
| WO | WO 2012/089655 A2 | 7/2012 | |
| WO | WO 2012/089657 A2 | 7/2012 | |
| WO | 2013/092539 A1 | 6/2013 | |
| WO | 2013/092541 A1 | 6/2013 | |

OTHER PUBLICATIONS

International Search Report and Written Opinion for International Application No. PCT/EP2010/052576 dated May 11, 2010.
International Preliminary Report on Patentability for International Application No. PCT/EP2010/052576 dated May 17, 2011.
International Search Report and Written Opinion for International Application No. PCT/EP2010/052577 dated May 11, 2010.
International Preliminary Report on Patentability for International Application No. PCT/EP2010/052577 dated May 17, 2011.
Chinese Office Action dated Feb. 17, 2013 for Application No. 201080009689.4.
English language machine translation of Chinese Office Action dated Feb. 17, 2013 for Application No. 201080009689.4.
Derwent abstract for CN 1693396 A (publication date Nov. 19, 2005).
Questel QPAT abstract for DE 102 25 367 C1 (publication date Sep. 18, 2003).
English language machine translation for RU 2 391 368 C1 (publication date Jun. 10, 2010).
Patent Abstracts of Japan for JP 55-120613 A (publication date Sep. 17, 1980).
Patent Abstracts of Japan for JP 58-021411 A (publication date Feb. 8, 1983).
Patent Abstracts of Japan for JP 58-185604 A (publication date Oct. 29, 1983).
Patent Abstracts of Japan for JP 60-047074 A (publication date Mar. 14, 1985).
Wikipedia, the free encyclopedia, "Lewis acids and bases," Jun. 15, 2012, 7 pages.
Mannari et al., "Two-Component High-Solid Polyurethane Coating Systems Based on Soy Polyols," JCT Research, vol. 3, No. 2, Apr. 2006, p. 151-157.
Wikipedia, the free encyclopedia, "Trifluoromethanesulfonate," Jun. 5, 2012, 3 pages.
Tullo, Alexander H., "Paints from Plants," www.cen-online.org, Apr. 12, 2010, p. 16-19.

(56) References Cited

OTHER PUBLICATIONS

Zhong et al., "Novel Coatings From Soybean Oil Phosphate Ester Polyols," Coatings Research Institute/Eastern Michigan Univ., vol. 73, No. 915, Apr. 2001, p. 53-57.
Wikipedia, the free encyclopedia, "Zinc trifluoromethanesulfonate," Jun. 5, 2012, 2 pages.
Chinese Office Action dated Nov. 30, 2011 for Application No. 2008800190672.
Chinese First Office Action dated Dec. 5, 2012 for Application No. 201080009688X.
Chinese Second Office Action dated Aug. 5, 2013 for Application No. 201080009688X.
Patent Abstracts of Japan for JP 60-156707 A (publication date Aug. 16, 1985).
Patent Abstracts of Japan for JP 60-156708 A (publication date Aug. 16, 1985).
Patent Abstracts of Japan for JP 63-112670 A (publication date May 17, 1988).
Patent Abstracts of Japan for JP 02-092916 A (publication date Apr. 3, 1990).
Patent Abstracts of Japan for JP 02-232219 A (publication date Sep. 14, 1990).
Patent Abstracts of Japan for JP 03-091579 A (publication date Apr. 17, 1991).
Patent Abstracts of Japan for JP 09-183940 A (publication date Jul. 15, 1997).
Patent Abstracts of Japan for JP 11-140160 A (publication date May 25, 1999).
Patent Abstracts of Japan for JP 2004-250505 A (publication date Sep. 9, 2004).
Patent Abstracts of Japan for JP 2008-156595 A (publication date Jul. 10, 2008).
Wikipedia, the free encyclopedia, "Acid strength," Jun. 15, 2012, 9 pages.
Dahlke et al., "Polyhydroxy Fatty Acids and Their Derivatives from Plant Oils," JAOCS, vol. 72, No. 3 (1995), p. 349-353.
Diehl et al., "Waterborne Mechanical Dispersions of Polyolefins," The Dow Chemical Co., MRS 2004 Fall Meeting Proceeding: vol. 838E O10.19, p. 1-14.
Guo et al., "Hydrolysis of Epoxidized Soybean Oil in the Presence of Phosphoric Acid," J Am Oil Chem Soc., vol. 84 (2007), p. 929-935.
Guo et al., "Rigid Polyurethane Foams Based on Soybean Oil," Journal of Applied Polymer Science, vol. 77 (2000), 3 pages.
Ionescu et al., "Ethoxylated Soybean Polyols for Polyurethanes," J Polym Environ, vol. 15 (2007), p. 237-243.
Men'Shikova et a., "Synthesis of Carboxylated Monodisperse Latexes and Their Self-Organization in Thin Films," Russian Jour of App Chem, vol. 78, No. 1, 2005, p. 159-165.
Norakankorn et al., "Synthesis of core/shell structure of glycidyl-functionalized . . . polymerization," Euro Polym Jour 45 (2009), p. 2977-2986.
Mishra et al., "Synthesis and Characterization of Butyl Acrylate/ Methyl Methacrylate/Glycidyl Methacrylate Latexes," Jour App Polym Science, vol. 115 (2010), p. 549-557.
Kiplinger, Jon, "Phosphate polymerizable adhesion promoters.," JCT Coatings Tech, Feb. 1, 2005, 11 pages.
M.S. Ibrahim et al., "Development of Radiation curable surface coating based on soybean oil.," 8th Arab Internationalconference on Polymer Science and Technology, 13 pages, Nov. 27-30, 2005.
"Trifluoroacetic acid," GPS Safety Summary, Phodia: Member of the Solvay Group, Dec. 2012.
Pka data, www.ochemonline.com, Sep. 2010.
"Trifluoroacetic acid," Wikipedia, the free encyclopedia, 4 pages, May 2014.
Rakita, "Triflic acid and its derivatives. A family of useful reagents for synthesis," Fluorine Chemistry, chimica oggi, Chemistry Today, Mar./Apr. 2004, pp. 48-50.

* cited by examiner

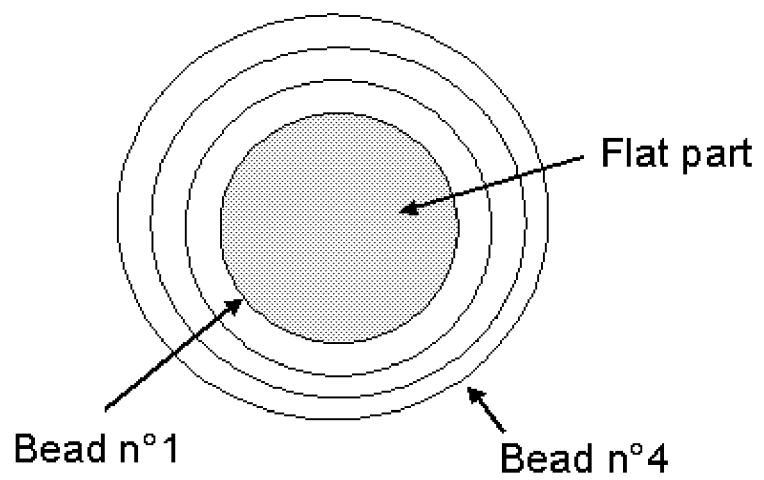

HYDROXYL FUNCTIONAL OIL POLYOL ACRYLIC GRAFT COPOLYMERS

BACKGROUND OF THE INVENTION

1. Field of the Invention

The present invention relates to hydroxyl functional oil polyol acrylic graft copolymers, coating compositions formed from the hydroxyl functional oil polyol acrylic graft copolymers, methods of coating substrates with the coating compositions, and substrates coated with the coating compositions.

2. Description of Related Art

Current art is primarily based on epoxy resin technology cured with amino resins and phenolics. Coating compositions formed from bisphenol A based epoxy resins have been used to coat packaging and containers for foods and beverages. However, there is a desire among some consumers and brand owners for coating compositions free, or substantially free, of bisphenol A for packaging and containers for food and beverages U.S. Pat. No. 5,728,796 discloses a process which reacts an epoxide-containing compound with an aliphatic hydroxyl containing compound in the presence of a sulfonic acid catalyst. This process is used to form epoxy resins having high molecular weights.

U.S. Pat. No. 4,012,559 discloses a radiation curable coating composition having an acrylic copolymer, a polyfunctional compound having a molecular weight not greater than 2,000, and an epoxidized vegetable oil. It is explained that the cured compositions can be coated onto metal to form pre-coated metal products Guo, et al., *Rigid Polyurethane Foams Based on Soybean Oil*, Journal of Applied Polymer Science, Vol. 77, 467-473 (2000) teaches the reaction of an epoxidized soybean oil with methanol to form an epoxidized soybean oil polyol that is used to prepare polyurethane foams for use in thermal insulation and packaging.

U.S. Patent Application Publication No. 2008/0302694 discloses a radiation curable coating composition having an epoxidized vegetable oil oligomer prepared from the reaction of an epoxidized vegetable oil and a hydroxyl functional acrylate or hydroxyl functional methacrylate in the presence of a sulfonic acid catalyst. This composition can be used as a coating for packaging materials in food storage.

U.S. Pat. No. 4,212,781 discloses processes for modifying an epoxy resin through a reaction with a copolymerizable monomer in the presence of an initiator. A graft polymer is formed from the epoxy resin by the grafting an addition polymer onto the aliphatic backbone of the epoxy resin. It is disclosed that the process is useful for making polymer blends for coating compositions.

There is a desire to produce packaging coatings that do not contain bisphenol A or are substantially free of bisphenol A. The hydroxyl functional oil polyol acrylic graft copolymers of the invention can be used in the preparation of coating compositions suitable, inter alia, as packaging coatings for food and beverage packaging and containers. They can be formulated to provide higher solids for application and improved corrosion resistance compared to some commercial epoxy coating systems.

SUMMARY OF THE INVENTION

The technology of the present invention has the capability of providing better corrosion resistance and higher solids coatings than some of the coatings of the current art. Higher solids allows broader coating latitude in a single pass operation.

The present invention includes processes for producing a hydroxyl functional oil polyol acrylic graft copolymer. Such processes can be performed in a single reactor or in multiple reactors. In some embodiments of the invention, a hydroxyl functional oil polyol acrylic graft copolymer is prepared by a method comprising the steps of reacting an epoxidized vegetable oil with a hydroxyl functional material in the presence of an acid catalyst to form a hydroxyl functional oil polyol, and reacting the hydroxyl functional oil polyol with an ethylenically unsaturated monomer component in the presence of an initiator to form the hydroxyl functional oil polyol acrylic graft copolymer.

The present invention also discloses coating compositions comprising a hydroxyl functional oil polyol acrylic graft copolymer prepared by a method comprising reacting an epoxidized vegetable oil with a hydroxyl functional material in the presence of an acid catalyst to form a hydroxyl functional oil polyol, reacting the hydroxyl functional oil polyol with an ethylenically unsaturated monomer component in the presence of an initiator to form a hydroxyl functional oil polyol acrylic graft copolymer, and crosslinking the hydroxyl functional oil polyol acrylic graft copolymer with a crosslinker to form the coating composition.

In some embodiments, the present invention includes methods of coating a substrate by mixing the hydroxyl functional oil polyol acrylic graft copolymer with a crosslinker to form a mixture, applying the mixture to the substrate, and crosslinking the mixture. Substrates coated with the coating compositions are also disclosed. In some embodiments, the substrate is a can or packaging.

DESCRIPTION OF THE DRAWINGS

FIG. 1 illustrates the can ends employed in the evaluation of Example 6.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

Other than in the operating examples, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Unless stated otherwise, all percentages, ratios and proportions herein are by weight and particularly unless otherwise specifically stated, the proportions of the components in the compositions described are given in percentage pertaining to the total mass of the mixture of these components.

Also herein, the recitations of numerical ranges by endpoints include all numbers subsumed within that range (e.g., 1 to 5 includes 1, 1.5, 2, 2.75, 3, 3.80, 4, 5, etc.).

Also herein, "a," "an," "the", "at least one", and "one or more" are used interchangeably.

Also herein, the term "comprises" and variations thereof do not have a limiting meaning where these terms appear in the description and claims.

The terms "for example", "without limitation" and the like, as well as the exemplary compounds, ranges, parameters and the like disclosed throughout the application and claims are intended to identify embodiments of the invention in a non-limiting manner Other compounds, ranges, parameters and the like can be employed by those skilled in the art without departing from the spirit and scope of the invention.

The present invention includes substrates coated at least in part with a coating composition of the invention and methods for coating the substrates. The term "substrate" as used herein includes, without limitation, cans, metal cans, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of food and beverages.

The present invention includes methods for preparing hydroxyl functional oil polyol acrylic graft copolymers by reacting an epoxidized vegetable oil with a hydroxyl functional material in the presence of an acid catalyst to form a hydroxyl functional oil polyol, and reacting the hydroxyl functional oil polyol with an ethylenically unsaturated monomer component in the presence of an initiator to form the hydroxyl functional oil polyol acrylic graft copolymer. The hydroxyl functional oil polyol acrylic graft copolymers can be used, inter alia, in the preparation of packaging coatings. In some embodiments of the invention, the hydroxyl functional oil polyol acrylic graft copolymers are crosslinked with a crosslinker to form a coating composition for food and beverage packaging and containers.

In some embodiments of the invention, hydroxyl functional oil polyol acrylic graft copolymers are made into solvent and waterborne coatings compositions. Solvent borne coating compositions in some embodiments contain, for non-limiting example, an ethylenically unsaturated monomer component that includes without limitation non-functional ethylenically unsaturated monomers such as, for non-limiting example, butyl acrylate, methyl methacrylate, styrene, and the like, and optionally with lesser amounts of functional monomers such as, for non-limiting example, hydroxy propyl methacrylate, hydroxy ethyl acrylate, glycidyl methacrylate, acrylic acid, methacrylic acid and the like, as well as mixtures thereof. In some embodiments of the invention, hydroxyl functional monomers are added at a level of about 0 to about 30% by weight of the ethylenically unsaturated monomer component mixture, and acid functional monomers are added at a level of about 0 to about 30% by weight of the ethylenically unsaturated monomer component mixture. The water borne coating compositions in some embodiments of the invention contain non-functional and hydroxyl functional monomers as listed above, with higher levels of acid functional monomer to render the composition water dispersible. In some embodiments, about 10 to about 50% by weight of the ethylenically unsaturated monomer component mixture is an acid functional monomer. In some embodiments, the acid functional monomer is methacrylic acid. In that case, the hydroxyl functional oil polyol acrylic graft copolymer is inverted into water in some embodiments by adding a neutralizing base, such as without limitation, ammonia or a tertiary amine such as without limitation, dimethyl ethanol amine, and water. Final NV (non-volatile content by weight) is about 15 to about 40% by weight in some embodiments.

The epoxidized vegetable oil can be used alone or in combination with other epoxidized vegetable oils. Epoxidized vegetable oils can be prepared from vegetable oils by, for non-limiting example, adding hydrogen peroxide and formic or acetic acid to the vegetable oil, and then holding the mixture at an elevated temperature until some or all of the carbon-carbon double bonds are converted to epoxide groups.

Vegetable oils contain primarily glycerides which are triesters of glycerol and fatty acids with varying degrees of unsaturation. For non-limiting example, epoxidized vegetable oils for use in the invention can be made from vegetable oils (fatty acid triglycerides) such as without limitation, esters of glycerol and fatty acids having an alkyl chain of about 12 to about 24 carbon atoms. Fatty acid glycerides which are triglycerides in unsaturated glyceride oils are generally referred to as drying oils or semidrying oils. Drying oils include, for non-limiting example, linseed oil, perilla oil and combinations thereof, while semidrying oils include, without limitation, tall oil, soy bean oil, safflower oil and combinations thereof. Triglyceride oils in some embodiments have identical fatty acid chains or alternatively have different fatty acid chains attached to the same glycerol molecule. In some embodiments, the oils have fatty acid chains containing non-conjugated double bonds. In some embodiments, single double bond or conjugated double bond fatty acid chains are used in minor amounts. Double bond unsaturation in glycerides can be measured by iodine value (number) which indicates the degree of double bond unsaturation in the fatty acid chains. Unsaturated fatty acid glyceride oils employed in some embodiments of the invention have an iodine value greater than about 25 and alternatively between about 100 and about 210.

Naturally occurring vegetable oils for use in the invention can be for non-limiting example, mixtures of fatty acid chains present as glycerides, and include without limitation a distribution of fatty acid esters of glyceride, where the fatty acid distribution may be random but within an established range that may vary moderately depending on the growing conditions of the vegetable source. Soy bean oil is employed in some embodiments which comprises approximately about 11% palmitic, about 4% stearic, about 25% oleic, about 51% linolenic, and about 9% linoleic fatty acids, where oleic, linoleic and linolenic are unsaturated fatty acids. Unsaturated vegetable oils employed in some embodiments of the invention, include without limitation, glyceride oils containing non-conjugated unsaturated fatty acid glyceride esters such as, without limitation, linoleic and linolenic fatty acids.

Unsaturated glyceride oils include, without limitation, corn oil, cottonseed oil, grapeseed oil, hempseed oil, linseed oil, wild mustard oil, peanut oil, perilla oil, poppyseed oil, rapeseed oil, safflower oil, sesame oil, soy bean oil, sunflower oil, canola oil, tall oil, and mixtures thereof. Fatty acid glycerides for use in the invention include, for non-limiting example, those which contain linoleic and linolenic fatty acid chains, oils such as without limitation, hempseed oil, linseed oil, perilla oil, poppyseed oil, safflower oil, soy bean oil, sunflower oil, canola oil, tall oil, grapeseed oil, rattonseed oil, corn oil, and similar oils which contain high levels of linoleic and linolenic fatty acid glyceride. Glycerides can contain lesser amounts of saturated fatty acids in some embodiments. For non-limiting example, soy bean oil can be employed which contains predominantly linoleic and linolenic fatty acid glycerides. Combinations of such oils are employed in some embodiments of the invention. Vegetable oils can by fully or partially epoxidized by known processes, such as for non-limiting example, using acids such as, without limitation, peroxy acid for epoxidation of unsaturated double bonds of the unsaturated vegetable oil. Unsaturated glyceride oils employed in some embodiments include mono-, di-glycerides and mixtures thereof with tri-glycerides or fatty acid esters of saturated and unsaturated fatty acids.

In some embodiments, the epoxidized vegetable oil comprises corn oil, cottonseed oil, grapeseed oil, hempseed oil, linseed oil, wild mustard oil, peanut oil, perilla oil, poppyseed oil, rapeseed oil, safflower oil, sesame oil, soy bean oil, sunflower oil, canola oil, tall oil, a fatty acid ester, monoglyceride or diglyceride of such oils, or a mixture thereof.

Commercially available sources of epoxidized vegetable oils are used in some embodiments of the invention such as, for non-limiting example, epoxidized soy oil sold under the trade designations "VIKOLOX" and "VIKOFLEX 7170" available from Arkema, Inc, "DRAPEX 6.8" available from Chemtura Corporation, and "PLAS-CHECK 775" available from Ferro Corp. Other epoxidized vegetable oils for use in the invention include, for non-limiting example, epoxidized linseed oil sold under the trade designations "VIKOFLEX 7190" available from Arkema, Inc. and "DRAPEX 10.4" available from Chemtura Corporation, epoxidized cotton seed oil, epoxidized carthamus oil and mixtures thereof. Epoxidized soy bean oil is employed in some embodiments.

In some embodiments of the invention, the hydroxyl functional material includes, without limitation, propylene glycol, ethylene glycol, 1,3-propane diol, neopentyl glycol, trimethylol propane, diethylene glycol, a polyether glycol, a hydroxyl functional polyester, a hydroxyl functional polycarbonate, a hydroxyl functional polyolefin, and mixtures thereof. The hydroxyl functional material includes an alcohol in some embodiments such as, without limitation, n-butanol, 2-ethyl hexanol, benzyl alcohol, and the like, alone, or in combination with diols or polyols.

In some embodiments, the hydroxyl functional material is present in an amount from about 1:99 to about 95:5 in a weight ratio of hydroxyl functional material to epoxidized vegetable oil, and alternatively from about 5:95 to about 40:60. In some embodiments, the equivalent ratio of hydroxyl functionality of the hydroxyl functional material to oxirane functionality in the epoxidized vegetable oil is from about 0.1:1 to about 3:1. In some embodiments, the equivalent ratio of hydroxyl functionality to oxirane functionality in the epoxidized vegetable oil is from about 0.2:1 to about 3:1. In some embodiments, the equivalent ratio of hydroxyl functionality to oxirane functionality in the epoxidized vegetable oil is about 0.2:1.

The acid catalyst employed to facilitate the reaction of the epoxidized vegetable oil with the hydroxyl functional material can be a strong acid catalyst in some embodiments of the invention such as, for non-limiting example, one or more sulfonic acids or another strong acid (an acid with a pKa about 3 or less), a triflic acid, a triflate salt of a metal of Group IIA, IIB, IIIA, IIIB or VIIIA of the Periodic Table of Elements (according to the IUPAC 1970 convention), a mixture of said triflate salts, or a combination thereof. In some embodiments, the amount of the acid catalyst can range from about 1 ppm to about 10,000 ppm, and alternatively from about 10 ppm to about 1,000 ppm, based on the total weight of the reaction mixture. Catalysts include, for non-limiting example, the Group IIA metal triflate catalysts such as without limitation magnesium triflate, the Group IIB metal triflate catalysts such as without limitation zinc and cadmium triflate, the Group IIIA metal triflate catalysts such as without limitation lanthanum triflate, the Group IIIB metal triflate catalysts such as without limitation aluminum triflate, and the Group VIIIA metal triflate catalysts such as without limitation cobalt triflate, and combinations thereof. The amount of the metal triflate catalyst can range, for non-limiting example, from about 10 to about 1,000 ppm, alternatively from about 10 to about 200 ppm, based on the total weight of the reaction mixture. Some embodiments of the invention employ a metal triflate catalyst in the form of a solution in an organic solvent. Examples of solvents include, without limitation, water, alcohols such as n-butanol, ethanol, propanol, and the like, as well as aromatic hydrocarbon solvents, cycloaliphatic polar solvents such as, for non-limiting example, cycloaliphatic ketones (e.g. cyclohexanone), polar aliphatic solvents, such as, for non-limiting example, alkoxyalkanols, 2-methoxyethanol, non hydroxyl functional solvents, and mixtures thereof.

In some embodiments, the epoxidized vegetable oil and hydroxyl functional material are heated in the presence of an acid catalyst to a temperature of about 50 to about 200° C. Optionally, a solvent can be included in the synthesis of the epoxidized vegetable oil and hydroxyl functional material to help control viscosity. In some embodiments, the solvent includes, for non-limiting example, a ketone such as, without limitation, methyl amyl ketone, an aromatic solvent such as, without limitation, xylene or Aromatic 100, an ester solvent or other non-hydroxyl functional solvent, and mixtures thereof. About 0 to about 90% of a solvent based on the total weight reaction mixture is employed in various embodiments of the invention, and alternatively about 5 to about 30% is employed. After about 2 to about 3 hours, >90% of the epoxide groups are consumed in some embodiments. Solvents selected from those described above as well as other solvents including, without limitation, hydroxyl functional solvents can be added upon cooling. In some embodiments, it is desirable to have a final NV (non-volatile content by weight) of about 30 to about 80.

In some embodiments, an ethylenically unsaturated monomer component and an initiator are reacted with the hydroxyl functional oil polyol to form a hydroxyl functional oil polyol acrylic graft copolymer. The ethylenically unsaturated monomer component and the initiator can be added after the hydroxyl functional oil polyol is cooled. In some embodiments, the ethylenically unsaturated monomer component and initiator are added over about 2 hours. In some embodiments, the reaction product of the hydroxyl functional oil polyol, ethylenically unsaturated monomer component and initiator is cooled after about a 1 hour hold to form the hydroxyl functional oil polyol acrylic graft copolymer. Although the term "acrylic" is used in describing the hydroxyl functional oil polyol acrylic graft copolymer, the word acrylic is used in its broadest sense to include all ethylenically unsaturated monomer components.

The ethylenically unsaturated monomer component can be composed of a single monomer or a mixture of monomers. The ethylenically unsaturated monomer component includes, without limitation, one or more or a mixture of vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include without limitation, methyl vinyl ether, isopropyl vinyl ether, n-butyl vinyl ether, and isobutyl vinyl ether. Acrylic monomers include without limitation, monomers such as for non-limiting example, lower alkyl esters of acrylic or methacrylic acid having an alkyl ester portion containing between about 1 to about 10 carbon atoms, as well as aromatic derivatives of acrylic and methacrylic acid. Acrylic monomers include, for non-limiting example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, glycidyl acrylate and methacrylate, and amino acrylates and methacrylates.

In some embodiments, the weight ratio of the ethylenically unsaturated monomer component to the hydroxyl functional oil polyol is from about 1:99 to about 99:1, alternatively from about 5:95 to about 95:5, and alternatively from about 30:70 to about 70:30.

Various initiators are employed alone or in combination in some embodiments of the invention. In some embodiments, initiators with high grafting efficiencies are employed. The initiator includes without limitation, azo compounds such as for non-limiting example, 2,2'-azo-bis(isobutyronitrile), 2,2'-azo-bis(2,4-dimethylvaleronitrile), and 1-t-butyl-azocyanocyclohexane), hydroperoxides such as for non-limiting example, t-butyl hydroperoxide and cumene hydroperoxide, peroxides such as for non-limiting example, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, 1,1,3,3-tetramethylbutylperoxy-2-ethylhexanoate, and t-butylperoxy pivilate, peresters such as for non-limiting example, t-butyl peracetate, t-butyl perphthalate, and t-butyl perbenzoate, as well as percarbonates, such as for non-limiting example, di(1-cyano-1-methylethyl)peroxy dicarbonate, perphosphates, t-butyl peroctoate, and the like and mixtures thereof.

In some embodiments, the initiator is present in an amount from about 0.1 to about 15%, and alternatively from about 1 to about 5%, based on the weight of the monomer mixture.

The temperature chosen for grafting the ethylenically unsaturated monomer component may vary with the half life of the selected initiator in some embodiments on the invention. For non-limiting example, at 130° C. t-butyl peroxy benzoate has a half life of about 30 minutes and can be employed for grafting. Dibenzoyl peroxide has a 30 minute half life at 100° C., and 100° C. could be a temperature to graft the hydroxyl functional oil polyol with dibenzoyl peroxide in some embodiments of the invention. Broadly, depending on the half life of the initiator used, the reaction can be carried out from about 50 to about 200° C.

In some embodiments, one or more mixtures of an initiator with or without a solvent is added after formation of the hydroxyl functional oil polyol acrylic graft copolymer to reduce the free monomer content. The compositions of the initiator and solvent in these one or more mixtures can be the same as or different than the compositions of these components used to form the hydroxyl functional oil polyol acrylic graft copolymer.

In some embodiments, the acrylic grafted hydroxyl functional oil polyol is mixed with a crosslinker to form a curable coating composition. A non-limiting list of crosslinkers for use in the invention includes benzoguanamine, benzoguanamine formaldehyde, glycoluril, melamine formaldehyde, a phenolic crosslinker, phenol formaldehyde, urea formaldehyde, an isocyanate, a blocked isocyanate, and mixtures thereof. In various embodiments, the crosslinker to hydroxyl functional oil polyol acrylic graft copolymer ratio is about 1:99 to about 90:10, and alternatively about 5:95 to about 60:40. Optionally, the mixture of the acrylic grafted hydroxyl functional oil polyol and crosslinker can occur in the presence of a cure catalyst. Cure catalysts include, for non-limiting example, dodecyl benzene sulfonic acid, p-toluene sulfonic acid, phosphoric acid, and the like and mixtures thereof. In some embodiments, other polymers that may blended into the coating composition, such as without limitation, polyethers, polyesters, polycarbonates, polyurethanes and the like, as well as mixtures thereof. Cure conditions for packaging coatings in some embodiments are about 10 to about 60 seconds at about 500° F. to about 600° F., and alternatively about 1 minute to about 20 minutes at about 250° F. to about 500° F.

The hydroxyl functional oil polyol acrylic graft copolymers and the coating compositions of the invention can include conventional additives known to those skilled in the art, such as without limitation, flow agents, surface active agents, defoamers, anti-cratering additives, lubricants, meat-release additives, and cure catalysts.

The hydroxyl functional oil polyol acrylic graft copolymers can be crosslinked with a crosslinker to form coating compositions. In some embodiments of the invention, one or more coating compositions are applied to a substrate, such as for non-limiting example, cans, metal cans, packaging, containers, receptacles, can ends, or any portions thereof used to hold or touch any type of food or beverage. In some embodiments, one or more coatings are applied in addition to the coating compositions of the present invention, such as for non-limiting example, a prime coat may be applied between the substrate and the coating composition.

The coating compositions can be applied to substrates in any manner known to those skilled in the art. In some embodiments, the coating compositions are sprayed or roll coated onto a substrate.

When applied, the coating compositions contain, for non-limiting example, between about 10% and about 30% by weight polymeric solids relative to about 70% to about 90% water, including other volatiles such as, without limitation, minimal amounts of solvents, if desired. For some applications, typically those other than spraying, solvent borne polymeric solutions can contain, for non-limiting example, between about 20% and about 60% by weight polymer solids. Organic solvents are utilized in some embodiments to facilitate roll coating or other application methods and such solvents can include, without limitation, n-butanol, 2-butoxy-ethanol-1, xylene and other aromatic solvents and ester solvents, and mixtures thereof. In some embodiments, n-butanol is used in combination with 2-butoxy-ethanol-1. The coating compositions of the present invention can be pigmented and/or opacified with known pigments and opacifiers in some embodiments. For many uses, including food use for non-limiting example, the pigment can be zinc oxide, carbon black, or titanium dioxide. The resulting coating compositions are applied in some embodiments by conventional methods known in the coating industry. Thus, for non-limiting example, spraying, rolling, dipping, and flow coating application methods can be used for both clear and pigmented films. In some embodiments, after application onto a substrate, the coating composition is thermally cured at temperatures in the range of about 130° C. to about 250° C., and alternatively higher for time sufficient to effect complete curing as well as volatilizing any fugitive components.

For substrates intended as beverage containers, the coating are applied in some embodiments at a rate in the range from about 0.5 to about 15 milligrams of polymer coating per square inch of exposed substrate surface. In some embodiments, the water-dispersible coating is applied at a thickness between about 0.1 and about 1 mil.

EXAMPLES

The invention will be further described by reference to the following non-limiting examples. It should be understood that variations and modifications of these examples can be made by those skilled in the art without departing from the spirit and scope of the invention.

Example 1

Preparation of Hydroxyl Functional Oil Polyol
11.0 grams of propylene glycol, 112.0 grams of epoxidized soy bean oil, 30.9 grams of methyl amyl ketone and 0.036 grams of Nacure A-218 (available from King Industries) were stirred under nitrogen and warmed to 150° C. The initial exotherm was controlled at <155° C., and the mixture was held at 150° C. for about 2 hours then cooled. Oxirane titration indicated >99.9% conversion of the epoxide groups.
Preparation of Hydroxyl Functional Oil Polyol Acrylic Graft Copolymer
100 grams of hydroxyl functional oil polyol was mixed with 80 grams of Aromatic 100 and 60 grams methyl amyl ketone and heated to 130° C. under nitrogen. 6.4 grams of hydroxy propyl methacrylate, 36.8 grams of styrene, 36.8 grams of butyl acrylate and 1.6 grams of t-butyl peroxy benzoate were fed into the mixture over 2 hours. The resultant mixture was held for 1 hour at 130° C. and cooled.
Preparation of Hydroxyl Functional Oil Polyol Acrylic Graft Copolymer Coating Composition
15 grams of the hydroxyl functional oil polyol acrylic graft copolymer was mixed with 5.0 grams of Cymel 1123 (available from Cytec Industries) and 1.0 grams of dodecyl benzene sulfonic acid (10% in butanol) to form a hydroxyl functional oil polyol acrylic graft coating copolymer composition.
Properties of Coating Composition
The hydroxyl functional oil polyol acrylic graft copolymer coating composition was drawn down an aluminum panel and baked at 580° F. for 20 seconds. The film was glossy, low in color and hard. The film was removed with 20 MEK double rubs. The film had no blush after 1 minute in boiling water, and was bent down to about 2 T without cracking or adhesion loss.

Example 2

Preparation of Hydroxyl Functional Oil Polyol
50.9 grams of diethylene glycol and 150 grams of epoxidized soy bean oil were added to a 1 liter flask. 0.02 grams of Nacure A-218 (available from King Industries) was added to the flask at 20° C. and the mixture was stirred under nitrogen and warmed to 160° C. The initial exotherm was controlled at <165° C., and the mixture was held at 160° C. for about 3 hours. Oxirane titration indicated >99.9% conversion of the epoxide groups. 50.3 grams of butyl cellosolve was added on cool down to give 80% NV.

Example 3

Preparation of Hydroxyl Functional Oil Polyol
50.0 grams of neopentyl glycol and 150 grams of epoxidized soy bean oil were added to a 1 liter flask. 0.02 grams of Nacure A-218 (available from King Industries) was added to the flask at 20° C. and the mixture was stirred under nitrogen and warmed to 160° C. The initial exotherm was controlled at <165° C., and the mixture was held at 160° C. for about 3 hours. Oxirane titration indicated >99.9% conversion of the epoxide groups. 50.3 grams of butyl cellosolve was added on cool down to give 80% NV.

Example 4A

Preparation of Hydroxyl Functional Oil Polyol
185.500 grams of propylene glycol, 812.450 grams of epoxidized soy bean oil and 0.206 grams of Nacure A-218 (available from King Industries) were stirred under nitrogen and warmed to 150° C. (141 grams of propylene glycol remained as unreacted solvent). The initial exotherm was controlled at <155° C., and the mixture was held at 150° C. for about 2 hours then cooled. Oxirane titration indicated >99.9% conversion of the epoxide groups.

Example 4B

Preparation of Hydroxyl Functional Oil Polyol Acrylic Graft Copolymer
998.156 grams of the hydroxyl functional oil polyol of Example 4A was mixed with 1000 grams of butyl cellosolve and heated to 100° C. under nitrogen. 100.000 grams of hydroxy propyl methacrylate, 450.000 grams of methyl methacrylate, 450.000 grams of butyl methacrylate, and 20.000 grams of dibenzoyl peroxide were fed into the mixture over 2 hours. The resultant mixture was held for 1 hour at 100° C., 677 g methyl amyl ketone was added, and the resultant mixture was cooled to form a hydroxyl functional oil polyol acrylic graft copolymer.

Example 5A

Preparation of Hydroxyl Functional Oil Polyol Acrylic Graft Copolymer Emulsion
62.5 grams of hydroxyl functional oil polyol from Example 4A, 27.5 grams of n-butanol and 30 grams of butyl cellosolve were charged in a flask and heated to 100° C. 40 grams of methyl methacrylate, 40 grams of butyl methacrylate, 20 grams of methacrylic acid and 3.5 grams of dibenzoyl peroxide were added to the flask over two hours while maintaining the temperature at 100° C. The resulting mixture was held for an additional hour at 100° C. 16.6 grams of dimethylethanolamine and 30 grams of deionized water were added to the resulting mixture over 30 minutes while allowing the temperature to fall to 80° C. 331 grams of deionized water were added to the resulting mixture over one hour while allowing the temperature to fall to 40° C. to form a hydroxyl functional oil polyol acrylic graft copolymer emulsion.

Example 5B

Preparation Hydroxyl Functional Oil Polyol Acrylic Graft Copolymer Coating Composition 180 grams of the hydroxyl functional oil polyol acrylic graft copolymer emulsion was mixed with 20 grams of Santolink EP-560 (available from Cytec Industries) and 5 grams of HRJ 15766 phenolic resin (available from SI Group) to form a hydroxyl functional oil polyol acrylic graft copolymer coating composition.

Example 6

Preparation Hydroxyl Functional Oil Polyol Acrylic Graft Copolymer Coating Composition 59.501 grams of the hydroxyl functional oil polyol acrylic graft copolymer of Example 4B was mixed with 0.329 grams of Modaflow acrylic flow agent (available from Cytec Industries), 0.966 grams of Contra Air Poly defoamer (available from Ulrich GmbH), 0.04 grams of Byk 310 defoamer (available from BYK Chemie), 0.867 grams of a carnauba wax dispersion, 13.867 grams of phenolic resin RSO199 (available from Cytec Industries), 8.258 grams of phenolic resin Santolink EP-560 (available from Cytec Industries), 0.383 grams of Cymel 303, 1.913 grams of Resimene 745 (available from INEOS Melamines), 1.235 grams of Cymel 27-809 (available from Cytec Industries), 3.925 grams of n-butanol, 3.925 grams of Aromatic 100 solvent, 3.925 grams of butyl cellosolve and 0.867 grams of polyethylene wax dispersion to form a hydroxyl functional oil polyol acrylic graft copolymer coating composition.

Coating compositions prepared by the method described in Example 6 were coated onto metal sheets and baked for 12 minutes at 400 F. The sheets were then stamped to form can ends, subjected to various solutions, and evaluated for the properties shown in the following Tables. The profile of the can ends employed in the evaluations is illustrated in FIG. 1. The flat section and the bead locations of the can ends are identified. It was observed that bead n° 2 was the most severe bead.

| | Example 6 (Inv.) | 640CRT260 (Comp.) |
|---|---|---|
| Electrolytic Tin Plate - standard ends (processing 130° C./1 h) | | |
| Salt 1% | | |
| Attack | 1 (1, 1, 1, 1) | 1 (1, 1, 1, 1) |
| Adhesion | 1 (1, 1, 1, 1) | 1 (1, 1, 1, 1) |
| Blush | 1 | 1 |
| Citric acid (1%) + Salt (1%) | | |
| Attack | 1 (1, 3, 1, 1) | 1 (1, 1, 1, 1) |
| Adhesion | 1 (1, 1-2, 1, 1) | 4 (2, 2, 2, 2) |
| Blush | 1 | 4 |
| Tartaric acid 2% | | |
| Attack | 1 (1, 2-3, 1, 1) | 1 (1, 1, 1, 1) |
| Adhesion | 1 (1, 1-2, 1, 1) | 4 (2, 2, 2, 2) |
| Blush | 1 | 5 |
| Peas | | |
| Attack | 2 (3, 3, 3, 3) | 2 (2-3, 2-3, 2-3, 2-3) |
| Adhesion | 1 (1, 1, 1, 1) | 1 (1, 1, 1, 1) |
| Blush | 1 | 1 |
| Lactic acid (1%) | | |
| Attack | 1 (1, 2-3, 1, 1) | 3-4 (3-4, 3-4, 3-4, 3-4) |
| Adhesion | 1 (1, 1, 1, 1) | 3-4 (3-4, 3-4, 3-4, 3-4) |
| Blush | 1 | 1 |

| | Example 6 (Inv.) | 640CRT260 (Comp.) |
|---|---|---|
| Tin Free Steel - standard ends (processing 130° C./1 h) | | |
| Salt 1% | | |
| Attack | 4 (4, 4, 4, 4) | 1 (1, 1, 1, 1) |
| Adhesion | 3 (4, 4, 4, 4) | 3-4 (4, 4, 4, 4) |
| Blush | 2 | 2 |
| Tartaric acid 2% | | |
| Attack | 1 (1, 3-4, 1, 1) | 1 (1, 1, 1, 1) |
| Adhesion | 1 (1, 1, 1, 1) | 1 (1, 1, 1, 1) |
| Blush | 1 | 5 |

| | Example 6 (Inv.) | 640CRT260 (Comp.) |
|---|---|---|
| Wetting | OK | OK |
| MEK resistance | 2-3DR | 40DR |
| Slip | 0.06 | 0.04-0.05 |
| Hardness (g) | 500 | 700-800 |
| Cross hatch test | 100% OK | 100% OK |
| Double coat adhesion | OK | OK |
| WB + CuSO$_4$ | 68% | 87% |
| Ends + CuSO$_4$ (4 beads) | 1  2-3  1  1 | 1  1  1  1 |
| A.box + CuSO$_4$ | Edge 1  Edge 4 | Edge 1  Edge 4 |
| Before tape | 3/4ok  1/4ok | OK  1/3ok |
| After tape | 3/4ok  1/4ok | 1/2ok  1/4ok |
| Offset | Slight transfer | No transfer |
| Blocking | None | None |
| Powder side stripe adhesion | | |
| Before processing | Slight loss | OK |
| After (water/steam) | Total loss | OK |
| Liquid side strip adhesion | | |
| Before processing | OK | OK |
| After (water/steam) | OK | OK |

Legend:
The evaluations were visually performed and rated on a scale of 1 through 5, where 1 indicates acceptable performance and 5 indicates unacceptable performance
640CRT260 is available from AkzoNobel and contains bisphenol A.
640CRT260 has an NV of 36.5%
Example 6 has an NV of 44.5%

Example 7

Preparation of Hydroxyl Functional Oil Polyol Acrylic Graft Copolymer 188.223 grams of the hydroxyl functional oil polyol of Example 4A and 190.36 grams of butyl cellosolve were charged in a flask and heated to 100° C. 39.4148 grams of methyl methacrylate, 104.168 grams of butyl methacrylate, 45.7493 grams of methacrylic acid and 3.78664 grams of dibenzoyl peroxide were fed into the mixture over 2 hours at 100° C. The resultant mixture was held for 30 minutes at 100° C., then 1.41999 grams of t-butyl peroctoate and 1.41999 grams of methyl amyl ketone were added followed by a hold for 30 minutes at 100° C. Next, 1.41999 grams of t-butyl peroctoate and 1.41999 grams of methyl amyl ketone were added to the resultant mixture followed by a hold for 30 minutes at 100° C. Following the hold, 1.41999 grams of t-butyl peroctoate and 1.41999 grams of methyl amyl ketone were added followed by another hold for 90 minutes at 100°

C. 677 g methyl amyl ketone was added, and the resultant mixture was cooled to form a hydroxyl functional oil polyol acrylic graft copolymer.

Example 8

Preparation Hydroxyl Functional Oil Polyol Acrylic Graft Copolymer Coating Composition 145.83 grams of the hydroxyl functional oil polyol acrylic graft copolymer of Example 7 was mixed with 0.65 grams of Modaflow acrylic flow agent (available from Cytec Industries), 1.91 grams of Contra Air Poly defoamer (available from Ulrich GmbH), 0.08 grams of Byk 310 defoamer (available from BYK Chemie), 1.71 grams of a polyethylene wax dispersion, 1.71 grams of a carnauba wax dispersion 31.25 grams of phenolic resin RSO199 (available from Cytec Industries), 20.83 grams of phenolic resin Santolink EP-560 (available from Cytec Industries), 7.77 grams of n-butanol, 7.77 grams of Aromatic 100 solvent, and 7.77 grams of butyl cellosolve to form a hydroxyl functional oil polyol acrylic graft copolymer coating composition.

What is claimed is:

1. A method for preparing a thermally curable hydroxyl functional oil polyol graft copolymer for a coating composition usable for coating a food or beverage container, the method comprising:
   a) reacting an epoxidized vegetable oil with a hydroxyl functional polyol in the presence of a strong acid catalyst at a temperature from 50 to 200° C. to form a hydroxyl functional oil polyol; and
   b) reacting the hydroxyl functional oil polyol with an ethylenically unsaturated monomer component in the presence of an initiator to form the hydroxyl functional oil polyol graft copolymer;
   wherein the hydroxyl functional polyol is selected from the group consisting of propylene glycol; 1,3 propanediol; ethylene glycol; neopentyl glycol; trimethylol propane; diethylene glycol; a hydroxyl functional polyester; a hydroxyl functional polyolefin; or a mixture thereof.

2. The method of claim 1, wherein the epoxidized vegetable oil is derived from an unsaturated fatty acid glyceride.

3. The method of claim 1, wherein the strong acid catalyst comprises a triflate salt of a metal of Group IIA, IIB, IIIA, IIIB or VIIIA of the Periodic Table of Elements (according to the IUPAC 1970 convention), or a mixture thereof.

4. The method of claim 1, wherein the weight ratio of the ethylenically unsaturated monomer component to the hydroxyl functional oil polyol is from about 5:95 to about 95:5.

5. The method of claim 1, wherein the initiator comprises t-butyl peroxy benzoate, t-butyl peroctoate, dibenzoyl peroxide, 1,1,3,3-tetramethylbutyl-peroxy-2-ethylhexanoate, or a mixture thereof.

6. The method of claim 1, wherein the initiator is present in an amount from about 0.1 to about 15 wt % of the ethylenically unsaturated monomer component.

7. The method of claim 1, wherein the reaction of step a) is conducted in the presence of a solvent.

8. The method of claim 7, wherein the solvent comprises up to about 90% based on the total weight of the reaction mixture.

9. A method for preparing a coating composition usable for coating a food or beverage container, the coating composition comprising a thermally curable hydroxyl functional oil polyol graft copolymer, the method comprising:
   a) reacting an epoxidized vegetable oil with a hydroxyl functional polyol in the presence of a strong acid catalyst at a temperature from 50 to 200° C. to form a hydroxyl functional oil polyol, wherein the hydroxyl functional polyol is selected from the group consisting of propylene glycol; 1,3 propanediol; ethylene glycol; neopentyl glycol; trimethylol propane; diethylene glycol; a hydroxyl functional polyester; a hydroxyl functional polyolefin; or a mixture thereof;
   b) reacting the hydroxyl functional oil polyol with an ethylenically unsaturated monomer component in the presence of an initiator to form a hydroxyl functional oil polyol graft copolymer; and
   c) crosslinking the hydroxyl functional oil polyol graft copolymer with a crosslinker to form the coating composition.

10. The method of claim 9, wherein the crosslinker comprises phenol-formaldehyde, melamine formaldehyde, urea formaldehyde, benzoguanamine formaldehyde, a blocked isocyanate, or a mixture thereof.

11. A substrate coated with a coating composition prepared via the method of claim 9.

12. The method of claim 9, wherein the crosslinker comprises phenol-formaldehyde, melamine formaldehyde, urea formaldehyde, benzoguanamine formaldehyde, a blocked isocyanate, or a mixture thereof.

13. The method of claim 9, wherein the strong acid catalyst comprises a triflate salt of a metal of Group IIA, IIB, IIIA, IIIB or VIIIA of the Periodic Table of Elements (according to the IUPAC 1970 convention), or a mixture thereof.

* * * * *